United States Patent
Downen

(10) Patent No.: US 11,478,900 B2
(45) Date of Patent: *Oct. 25, 2022

(54) SKATE BLADE SHARPENER WITH INDEXING STONE

(71) Applicant: Maintain Your Edge, LLC, Greenwood, IN (US)

(72) Inventor: Daniel Ray Downen, Greenwood, IN (US)

(73) Assignee: Maintain Your Edge, LLC, Greenwood, IN (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/544,141

(22) Filed: Aug. 19, 2019

(65) Prior Publication Data

US 2020/0206878 A1 Jul. 2, 2020

Related U.S. Application Data

(63) Continuation of application No. 15/425,026, filed on Feb. 6, 2017, now Pat. No. 10,384,329.

(51) Int. Cl.
| | | |
|---|---|---|
| *B24D 15/06* | (2006.01) | |
| *B24D 15/00* | (2006.01) | |
| *B23F 21/03* | (2006.01) | |

(52) U.S. Cl.
CPC ............ *B24D 15/066* (2013.01); *B23F 21/03* (2013.01); *B24D 15/00* (2013.01)

(58) Field of Classification Search
CPC ........ B24D 15/00; B24D 15/066; B23F 21/03
See application file for complete search history.

(56) References Cited

U.S. PATENT DOCUMENTS

| | | | |
|---|---|---|---|
| 927,131 A * | 7/1909 | Dow | ....................... A63C 11/06 76/83 |
| 2,092,831 A * | 9/1937 | Cannon | ................ B24D 15/066 451/558 |
| 4,219,975 A | 9/1980 | Scholler | |
| 5,197,232 A | 3/1993 | Ellestad | |
| (Continued) | | | |

FOREIGN PATENT DOCUMENTS

DE 4443625 6/1996

OTHER PUBLICATIONS

U.S. Appl. No. 15/425,026, Notice of Allowance, 5 pgs dated May 6, 2019.

(Continued)

*Primary Examiner* — Christopher R Harmon

(57) ABSTRACT

A handheld skate blade sharpening tool that has an automatically indexing, rotating sharpening stone that matches the concaved profile of the skate blade retained within a two-piece body member. Screws hold the two-piece body member together to keep the round sharpening stone sized to match the desired concave profile. The sharpening stone will remove metal to match the shape of the stone each time the sharpener is moved back and forth along the blade. The sharpening stone has gears on each end of the stone that match the gears inside the two-piece body. As the tool is moved along the skate blade, the sharpening stone will incrementally rotate within the body when the direction is changed in the reciprocating motion by the user's back and for movement.

10 Claims, 4 Drawing Sheets

(56) References Cited

U.S. PATENT DOCUMENTS

| | | | |
|---|---|---|---|
| 5,383,307 A * | 1/1995 | Anderson | B24D 15/066 |
| | | | 451/545 |
| 5,431,597 A | 7/1995 | Anderson | |
| 5,492,037 A * | 2/1996 | Graham | A63C 3/10 |
| | | | 26/83 |
| 5,607,347 A | 3/1997 | Schoen | |
| 5,704,829 A | 1/1998 | Long | |
| D392,536 S | 3/1998 | Anerson | |
| D394,196 S | 5/1998 | Richardson | |
| 6,030,283 A * | 2/2000 | Anderson | B24D 15/066 |
| | | | 451/541 |
| 6,312,017 B1 | 11/2001 | Hardwick | |
| 6,726,543 B1 | 4/2004 | Klosterman | |
| 7,097,547 B2 | 8/2006 | McCroary | |
| 8,944,889 B2 | 2/2015 | Frommer | |

OTHER PUBLICATIONS

U.S. Appl. No. 15/425,026, Applicant Response filed, 7 pgs dated Apr. 18, 2019.
U.S. Appl. No. 15/425,026, NF Office Action, 9 pgs dated Dec. 18, 2018.
PCT/US2018/016681, Lee Young, ISR and WO, 6 pgs dated Jul. 2, 2018.
PCT/US2018/016681, Athina Nickitas-Etienne, IPRP, 5 pgs dated Aug. 6, 2019.

* cited by examiner

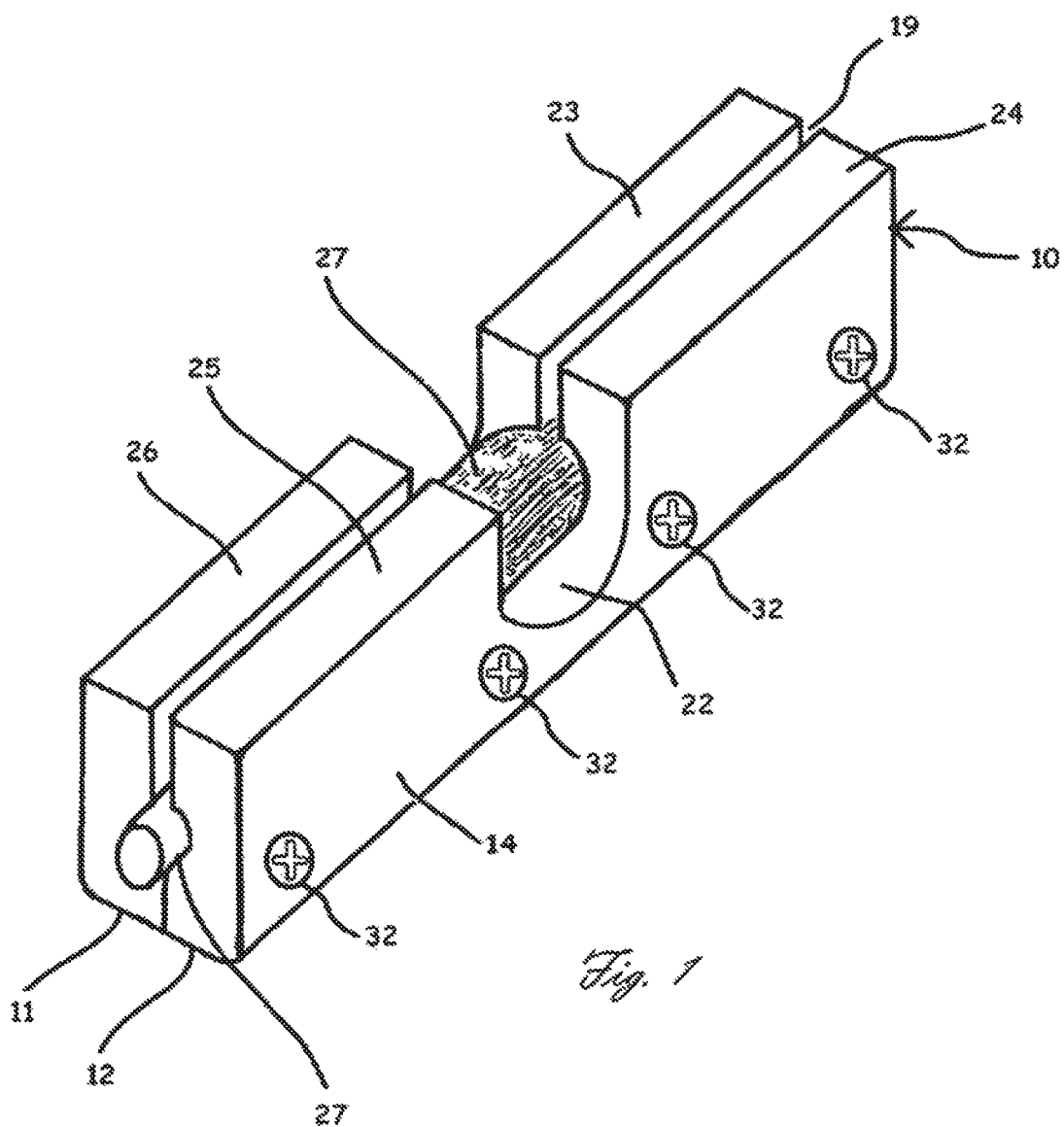

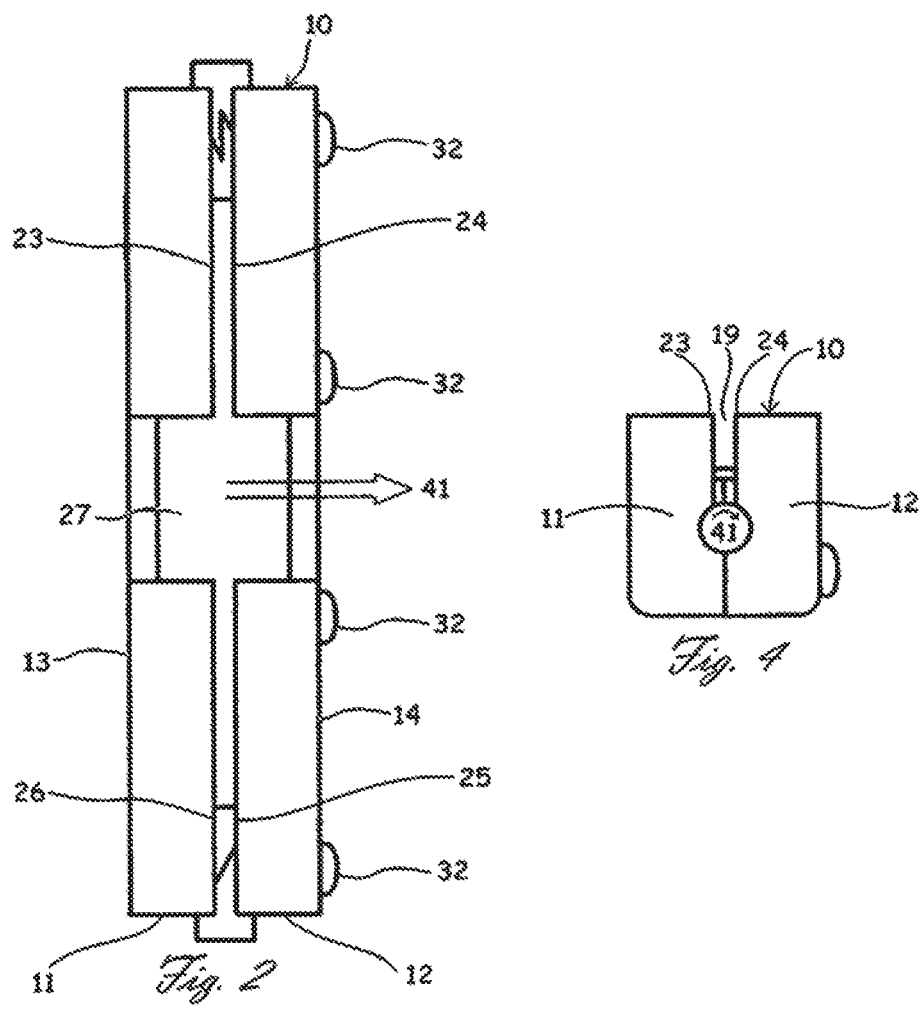
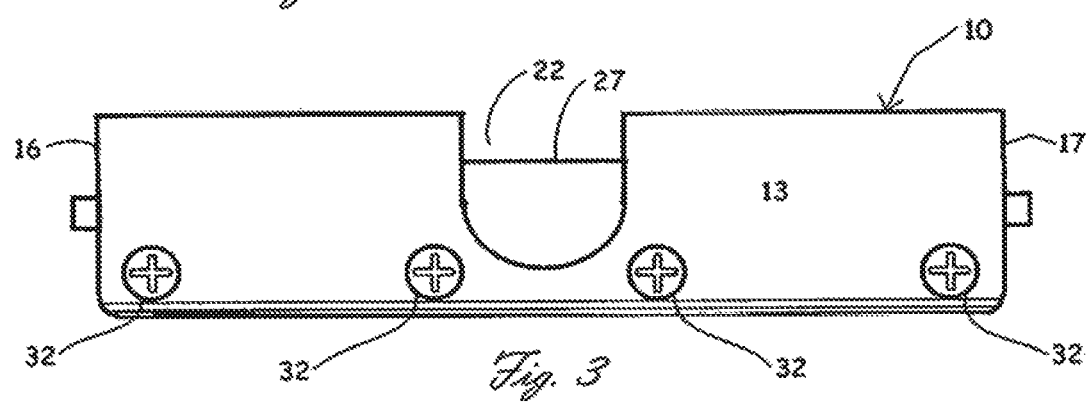

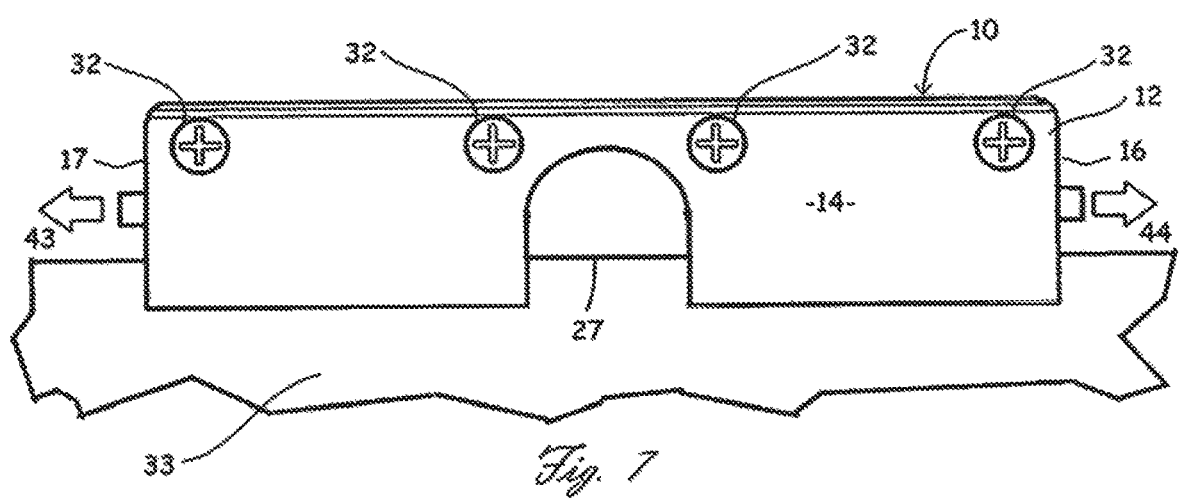
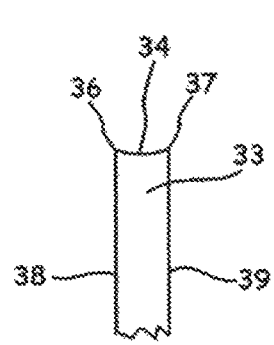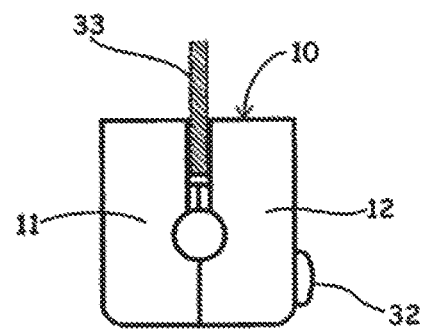

SKATE BLADE SHARPENER WITH INDEXING STONE

CROSS REFERENCE TO RELATED APPLICATION

This application claims the benefit of priority to U.S. Non-Provisional patent application Ser. No. 15/425,206, filed Feb. 6, 2017, now issued as U.S. Pat. No. 10,384,329 on Aug. 20, 2019, incorporated herein by reference.

BACKGROUND OF THE INVENTION

The following is a tabulation of some prior art that presently appears relevant:

| U.S. Pat. Nos. | | |
| --- | --- | --- |
| Pat. No. | Issue Date | Patentee |
| 8,944,889 | Feb. 3, 2015 | Frommer, Thomas P. |
| 7,097,547 | Aug. 29, 2006 | McCroary, Robert |
| 6,726,543 | Apr. 27, 2004 | Klosterman, Michael W. |
| 6,312,017 | Nov. 6, 2001 | Hardwick, Rick William |
| 6,030,283 | Feb. 29, 2000 | Anderson, Bradley J. |
| D394,196 | May 12, 1998 | Richardson, Phil G. |
| 5,607,347 | Mar. 4, 1997 | Schoen, Steven J. |
| 5,704,829 | Jan. 6, 1998 | Long, Jim |
| D392,536 | Mar. 4, 1998 | Anderson, Bradley J. |
| 5,431,597 | Jul. 11, 1995 | Anderson, Bradley J. |
| 5,197,232 | Mar. 30, 1993 | Ellestad, Everett M. |

Commonly, ice skates are sharpened or touched-up using a rotating grinding wheel of a grinding machine. The grinding machine takes a sizable cut out of the blade each time it is used to sharpen the blade, which reduces the useful life of the blade. The blades become excessively sharp, increasing the risk of injury. Also, the cost of using the grinding machine limits the number of times a skater can affordable sharpen his or her skates.

An alternative to the grinding machine is to use handheld sharpening tools. These tools have a stone that is moved back and forth lengthwise along the skate blade. The stone sharpening surface quickly wears or becomes dirty, whereby the tool must be replaced. Also, the user must manually move or rotate the stone for a new surface. Due to the lack of precision in manually rotating the stone, the stone is worn unevenly and has a shorter useful life.

BRIEF SUMMARY OF THE INVENTION

The invention is directed to a hand-operated ice skate sharpening tool that functions to prolong skate blade life and lower costs associated with conventional grinding methods of skate sharpening. The sharpener has a cylindrical sharpening stone that incrementally rotates with each stroke, whereby an unused surface of the stone is automatically exposed and used to sharpen the ice skate blade. Since the stone automatically rotates, the invention requires less user intervention and provides a more uniform wear and sharpening pattern. The stone can be manually rotated if the user desires. The stone can be removed from the housing for replacement or cleaning of the stone. An automatically rotating stone would require less user intervention and cleaning of the stone. An automatically rotating stone will also provide a more uniform wear pattern on the stone.

BRIEF DESCRIPTION OF THE DRAWINGS

In the drawings, closely related figures have the same number.

FIG. 1 is a perspective view of the ice skate sharpener invention;

FIG. 2 is a top view of the invention showing the slot where the skate blade can be inserted and has access to the sharpening stone.

FIG. 3 is a side view of the invention showing the stone and how the user has access to manually rotate the stone if desired;

FIG. 4 is an end view of the invention showing the rotation shaft and view along the slot where the skate blade would be inserted:

FIG. 7 is a side view of the skate sharpener of FIG. 1 with an ice skate blade inserted into the skate sharpener;

FIG. 8 is an end view of the skate sharpener of FIG. 1 with an ice skate blade inserted into the skate sharpener;

FIG. 9 is a partially sectioned end view of an ice skate blade showing the concave curved bottom surface of the blade.

Figure 5:
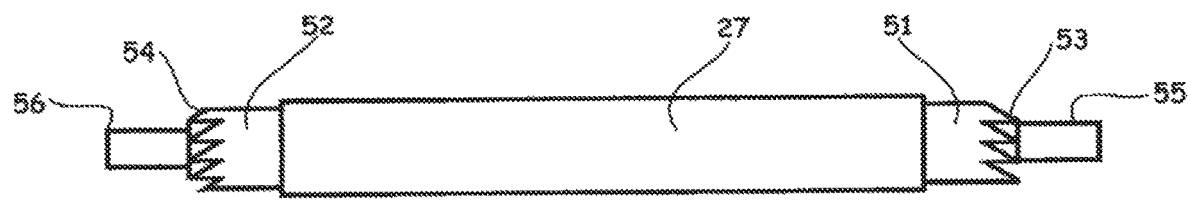
FIG. 5 is an internal view of the rotating stone, gears, and rotating shaft: when taken out of the invention.

| DRAWING – REFERENCE NUMERALS | |
| --- | --- |
| 10 ice skate blade sharpener | 11 left body half |
| 12 right body half | 13 left body half side |
| 14 right body half side | 16 skate blade sharpener close flat end |
| 17 skate blade sharpener far flat end | 19 slot for skate blade to be inserted into |
| 21 sharpening stone bore | 22 lateral arch to access stone |
| 23 far end top left body flange | 24 far end top right body flange |
| 25 close end top right body flange | 26 close end top left body flange |
| 27 sharpening stone | 31 hole for screws |
| 32 screws holding the body halves together | 33 skate blade to be sharpened |
| 34 concave portion of the skate blade | 36 inside edge of skate blade |
| 37 outside edge of skate blade | 38 inside side edge of skate blade |
| 39 outside side edge of skate blade | 41 rotational direction of stone and gears |
| 43 forward motion when in use | 44 backward motion when in use |
| 51 far gear shaft used to hold stone | 52 close gear shaft used to hold stone |
| 53 far gear teeth attached to stone | 54 close gear teeth attached to stone |
| 55 far rotation shaft attached to stone | 56 close rotation shaft attached to stone |
| 61 far gear saddle on body | 62 close gear saddle on body |
| 63 far gear teeth on body | 64 close gear teeth on body |
| 65 far rotation shaft saddle | 66 close rotation shaft saddle |

DETAILED DESCRIPTION OF THE INVENTION

The sharpener has two generally rectangular half bodies composed of right and left side on the longitudinal axis. A half cylindrical hole extends longitudinally through each of the body halves. A cylindrical stone with attached gear teeth and rotation shaft is placed in the half cylindrical hole of each side of the bodies for sharpening edges of a skate blade. The diameter of the stone is less than the diameter of the cylindrical hole within the bodies so that the stone never touches the body and can be rotated within the cylindrical hole to automatically position unused surfaces of the stone adjacent to the edges of the skate blade. The rotational shaft on the very end of the stone is slightly smaller than the hole of the body and extends outside the half bodies. The rotational shaft is what the stone and gear set rotate on. The stone has a convex curved outer surface that is complementary to the concave bottom surface of the skate blade. The stone can be removed from the bore by removing the screws that hold the body halves together for replacement or cleaning purposes. An arch within the body halves gives the user a view of the stone and will allow the user to rotate the stone manually if desired. Gear teeth just inside the ends of the longitudinal body halves mesh with the gear teeth attached to the stone. Each change of longitudinal direction will cause the non-engaged stone gear to set to move towards the non-engaged body gear set, which are one half pitch different, thereby forcing an incremental rotation before becoming completely engaged. This will incrementally turn the stone within the body, causing uniform wear and use of the sharpening stone.

The body of the sharpener has an elongated slot that extends parallel to the longitudinal axis of the cylindrical hole that houses the stone. This provides access to the outer surface of the stone for the blade to be sharpened. After being prepped with soap or honing oil, the blade is inserted into the slot to position the bottom surface of the blade in engagement with the outer surface of the stone. The half body flanges provide a slot to align the skate blade with the stone. The sharpener is then moved lengthwise along the blade in both longitudinal directions to sharpen the edges of the blade. Each change of direction will cause the stone to slightly shift within the body, engaging the stone gear teeth with the body gear teeth and causing the stone to incrementally turn. This incremental turn will make the entire stone useful in the sharpening process. The slot has a width slightly wider than the width of the blade to prevent lateral movement of the skate blade within the slot. Flanges guide the blade as the sharpener is moved relative to the blade. The sharpening procedure results in blade edges having a non-excessive sharpness, to facilitate skating and reduce the risk of injury. A transverse arch in the halves of the sharpener body exposes the surface of the stone to facilitate the manual rotation within the bore, if desired. The user uses a thumb and finger to slightly rotate the stone and position the stone, if desired. When all of the outer surface of the stone becomes worn, the stone can be replaced by removing the screws from the body halves and removing the stone from the bore.

Referring to FIGS. 1 and 9, the invention is shown as an ice skate blade sharpener indicated generally at 10. Ice skate blade sharpener 10 is used to make a concave groove 34 and define bottom edges 36 and 37 of an ice skate blade 33. Ice skate blade sharpener 10 is a handheld device that can be carried in an equipment bag and used at the rink to sharpen blade 33 to the user's personal preference to match ice conditions and the like.

Referring to FIGS. 1, 2, and 7, ice skate blade sharpener 10 has a generally rectangular left body half 11 and right body half 12 with a flat bottom surface that curves upward into a pair of upright side walls 13 and 14. Left body half 11 and right body half 12 have generally flat ends 16 and 17 that extend between side walls 13 and 14. Upper portions of side walls 13 and 14 go to define a top wall with flanges 23 to 26.

Referring to FIGS. 2, 4, and 8, a skate blade slot 19 extends longitudinally on top wall with flanges 23 to 26 along the length of left body half 11 and right body half 12. Slot 19 is open to each end 16 and 17 of left body half 11 and right body half 12. As shown in FIG. 8, slot 19 has a width that is slightly wider than the width of blade 33. The left body half 11 and right body half 12 has a centrally located cylindrical bore 21 that extends most of the length of left body half 11 and right body half 12. The top of bore 21 is open to slot 19. Slot 19 can have different widths to accommodate blades having different widths.

Referring to FIGS. 1, 2, 3, and 7, left body half 11 and right body half 12 have a transverse arch or U-shaped access 22 in top wall that interrupts slot 19. The bottom of arch 22 intersects the bottom portion of bore 21 adjacent a mid-point of bore 21. Top wall with flanges 23 to 26 are adjacent to groove 22. Top wall with flanges 23 to 26 are adjacent to groove 22. Top wall with flanges 23 to 26 have transversely spaced inner surfaces, generally parallel to the inner surfaces of left body half 11 and right body half 12 that form the upper portion of slot 19. Top wall with flanges 23 to 26 function to guide skate blade 33 and prevent lateral movement of the blade during the sharpening process.

Referring to FIGS. 2, 3, 4, 5 and 9, a generally cylindrical skate sharpening material or stone 27 is located in bore 21 of left body half 11 and right body half 12. Stone 27 has a diameter that is slightly less than the diameter of bore 21, whereby stone 27 can be rotated in bore 21 easily, as shown by arrow 41 of FIGS. 2 and 4. Stone 27 has a convex curved outer surface that is complementary to concave curve 34 on the bottom of skate blade 33. Stone 27 is incrementally indexed to align an unused sharpening surface with the lower end of slot 19 with each change of longitudinal direction. Stone 27 can be removed from bore 21 for replacement or cleaning purposes. The outer surface of stone 27 can have different convex curves to complement different concave curves on the bottom of other skate blades.

Figure 6:
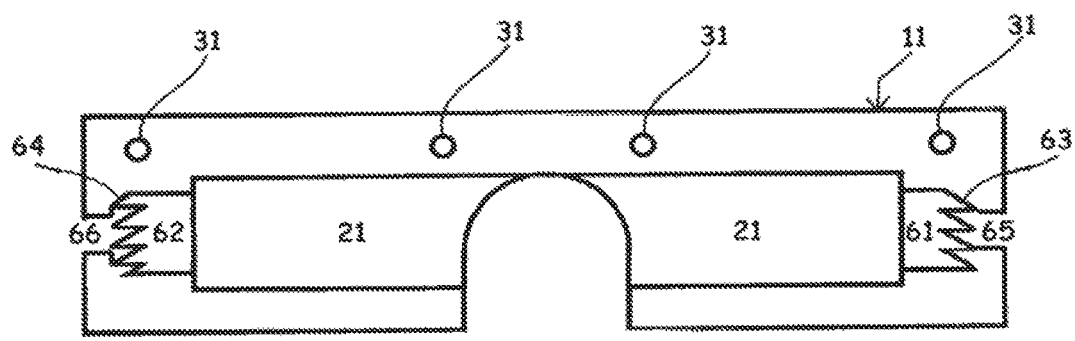
FIG. 6 is an internal view of one of the two body pieces when the sharpener is taken apart and the body half is turned to expose the gear teeth.

Referring to FIGS. 4, 5, and 6, left body half 11 and right body half 12 have a half cylindrical longitudinal bore 21 which is slightly larger than the stone 27. Left body half 11 and right body half 12 also have a half cylindrical bore 61 and 62, which is slightly larger than the stone saddles 51 and 52, respectfully. FIG. 5 gear teeth 53 and 54 are the same pitch and size to match the FIG. 6 body half. FIG. 5 stone gear teeth 53 and 54 are one half pitch rotated along the longitudinal axis from each other. FIG. 6 body gear teeth 63 and 64 are aligned with each other. In FIG. 5, the rotation shaft 55 and 56 are the only item that touches the body FIG. 6 shaft saddles 65 and 66, respectfully. When the ice skate blade sharpener 10 is in use, the FIG. 5 sharpening stone 27 and gears 53 and 54 will shift longitudinally in the FIG. 6 body half causing the gear teeth of 54 to engage with the gear teeth of 64, which causes a rotational movement 41 within the sharpener. Moving the sharpener in the opposite direction will cause the stone gear teeth 53 to engage with body gear teeth 63, which will cause another incremental rotation movement 41 along the longitudinal axis.

Referring to FIGS. 2, 7, 8, and 9, in use, blade 33 is positioned on a stable surface with concave portion of the blade 34 facing upward. Drops of honing oil are placed along the slot 19 to lubricate the tool and stone-to-blade contact. Ice skate blade sharpener 10 is inverted, as shown in FIG. 7, and slot 19 is aligned with the longitudinal exterior of blade 33. Left body half side wall 13 and right body half side wall 14 of left body half 11 and right body half 12, respectfully, are gripped with the thumb and forefinger of one hand of the user. The other hand is placed on the skate to temporarily fix the position of blade 33. Ice skate blade sharpener 10 is installed on blade 33 by moving blade 33 into slot 19 and making contact with stone 27. The width of slot 19 is only slightly larger than the width of blade 33, whereby sides 38 and 39 of blade 33 are located adjacent to the inner surfaces of left body half 11 and right body half 12 that define slot 19. This prevents lateral movement of blade 33 within slot 19 and prevents skewing of blade edges 36 and 37 during the sharpening process. The inner surface of flanges 23 to 26 engage sides 38 and 39. The operator moves ice skate blade sharpener 10 back and forth lengthwise along blade 33, as indicated by arrows 43 and 44 in FIG. 7, several times using downward pressure. Top wall flanges 23 and 26 function to guide blade 33 longitudinally within slot 19 relative to stone 27. The honing oil along slot 19 reduces friction between sides 38 and 39 and the inner surface of flanges 23 to 26 to reduce the force required for the sharpening stroke of the operator.

To finish blade 33, ice skate blade sharpener 10 is removed from blade 33 and excess oil is removed from blade 33 with a cloth or towel.

The invention claimed is:

1. A handheld tool for sharpening ice skate blades comprising:
   a rotatable cylindrical sharpening stone having a surface, and supported by a tool body and being movable relative to said tool body along a longitudinal axis,
   said sharpening stone including a first gear having first gear teeth,
   said tool body having second gear teeth,
   said first gear teeth being engageable with said second gear teeth,
   said first gear teeth having a different pitch than the second gear teeth,
   said sharpening stone automatically rotating to a different area of the stone surface with each longitudinal stroke of said handheld tool along the skate blade,
   wherein movement of said sharpening stone relative to said tool body along the longitudinal axis causes said stone to rotate incrementally in one direction.

2. The tool of claim 1 wherein the incremental rotation of said stone stops when said first teeth gear and said second gear teeth are fully meshed.

3. The tool as set forth in claim 1, wherein said tool body includes two opposite ends and an inside, said sharpening stone includes two opposite ends, one end of said sharpening stone including said first gear with the one end of said sharpening stone being supported on a corresponding end of said tool body within the inside of the tool body, the corresponding end of said tool body including said second gear teeth within the interior that engages the corresponding first gear teeth on the one end of said sharpening stone.

4. The tool as set forth in claim 3, wherein the second gear teeth on the inside of the tool body and the first gear teeth on said sharpening stone are adapted and configured to cause the stone to turn incrementally within the inside of said tool body each time the direction of the longitudinal stroke is changed along the longitudinal axis.

5. The tool as set forth in claim 3, wherein the sharpening stone includes a pivot shaft extending from each end of the sharpening stone.

6. The tool as set forth in claim 1, wherein said first gear and said second gear teeth are adapted and configured such that movement of said sharpening stone relative to said tool body along either direction of the longitudinal axis causes said sharpening stone to incrementally rotate in the same direction.

7. The tool of claim 1 wherein said tool body includes an access region that provides a visual indication of the incremental rotation of the stone.

8. The tool of claim 7 wherein the access region of said tool body is adapted and configured to permit finger control of the longitudinal position of said sharpening stone.

9. The tool of claim 7, wherein the access region is adapted and configured to permit manual rotation of said sharpening stone.

10. The tool as set forth in claim 1 wherein said sharpening stone has two opposing ends with said first gear being located on one end and including a third gear having third gear teeth being located on the opposite end, said tool body having an inside with the second gear teeth being located inside said tool body for engagement with said first gear teeth; the inside of said tool body further including fourth gear teeth being located for engagement with said third gear teeth.

* * * * *